US009399208B2

(12) United States Patent
Yang et al.

(10) Patent No.: US 9,399,208 B2
(45) Date of Patent: Jul. 26, 2016

(54) CATALYSTS FOR OXIDATION OF CARBON MONOXIDE AND/OR VOLATILE ORGANIC COMPOUNDS

(71) Applicant: BASF Corporation, Florham Park, NJ (US)

(72) Inventors: Xiaolin Yang, Edison, NJ (US); Pascaline Tran, Holmdel, NJ (US); Qingyuan Hu, East Brunswick, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 14/465,471

(22) Filed: Aug. 21, 2014

(65) Prior Publication Data

US 2015/0057149 A1     Feb. 26, 2015

Related U.S. Application Data

(60) Provisional application No. 61/869,137, filed on Aug. 23, 2013.

(51) Int. Cl.
*B01J 21/04*     (2006.01)
*B01J 21/12*     (2006.01)
(Continued)

(52) U.S. Cl.
CPC ........... *B01J 23/6447* (2013.01); *B01D 53/864* (2013.01); *B01D 53/8668* (2013.01);
(Continued)

(58) Field of Classification Search
CPC ........ B01J 21/04; B01J 21/063; B01J 21/066; B01J 21/08; B01J 21/12; B01J 23/40; B01J 23/42; B01J 23/44; B01J 23/46; B01J 23/462; B01J 23/464; B01J 23/468; B01J 23/52; B01J 37/0201; B01J 37/16
USPC ................... 502/325, 332–334, 339
See application file for complete search history.

(56) References Cited

U.S. PATENT DOCUMENTS 4,490,482 A    12/1984   Mathieu
2006/0229466 A1*   10/2006   Arhancet ................. B01J 21/18
                                                                             562/531
(Continued)

FOREIGN PATENT DOCUMENTS

WO     2005-115612 A1     12/2005

OTHER PUBLICATIONS

International Search Report dated Dec. 1, 2014.
(Continued)

*Primary Examiner* — Patricia L Hailey
(74) *Attorney, Agent, or Firm* — Lowenstein Sandler LLP (57) ABSTRACT

This application discloses catalysts and methods of making the catalysts. In one embodiment, a catalyst comprising: a reduced precious group metal in an amount greater than about 30 wt % based on the total precious group metal weight in the catalyst, wherein the catalyst oxidizes volatile organic compounds and/or carbon monoxide at a temperature of about 150° C. or lower, is disclosed. In another embodiment, a catalyst for oxidation of formaldehyde, methanol, formic acid, and/or carbon monoxide to form carbon dioxide at a temperature of from about 20° C. to about 45° C. and at about atmospheric pressure, the catalyst comprising: a reduced precious group metal dispersed on a support selected from the group consisting of $CeO_2$, $TiO_2$, $ZrO_2$, $Al_2O_3$, $SiO_2$, and combinations thereof, is disclosed.

23 Claims, 7 Drawing Sheets

(51) Int. Cl.
  *B01J 23/40* (2006.01)
  *B01J 23/46* (2006.01)
  *B01J 37/16* (2006.01)
  *B01J 23/644* (2006.01)
  *B01D 53/86* (2006.01)
  *B01J 37/18* (2006.01)
  *B01J 21/06* (2006.01)
  *B01J 23/42* (2006.01)
  *B01J 23/44* (2006.01)
  *B01J 23/52* (2006.01)
  *B01J 35/00* (2006.01)

(52) U.S. Cl.
  CPC ........... *B01D53/8687* (2013.01); *B01J 21/063* (2013.01); *B01J 21/066* (2013.01); *B01J 23/42* (2013.01); *B01J 23/44* (2013.01); *B01J 23/462* (2013.01); *B01J 23/464* (2013.01); *B01J 23/468* (2013.01); *B01J 23/52* (2013.01); *B01J 35/002* (2013.01); *B01J 35/006* (2013.01); *B01J 37/18* (2013.01); *B01D 2255/1021* (2013.01); *B01D 2255/1023* (2013.01); *B01D 2255/1026* (2013.01); *B01D 2255/2096* (2013.01); *B01D 2257/708* (2013.01); *B01D 2259/4508* (2013.01); *B01D 2259/4566* (2013.01)

(56) References Cited

U.S. PATENT DOCUMENTS

| | | | |
|---|---|---|---|
| 2007/0106088 A1* | 5/2007 | Benderly | C07C 5/333 560/211 |
| 2007/0106089 A1* | 5/2007 | Benderly | B01J 35/0006 560/211 |
| 2007/0215166 A1 | 9/2007 | Branton et al. | |
| 2010/0145094 A1* | 6/2010 | Schammel | C07C 51/265 562/408 |
| 2012/0027658 A1 | 2/2012 | Karwacki et al. | |

OTHER PUBLICATIONS

M. Molin, Department of Chemical Engineering, Lund University, Sweden, Jun. 27, 2011, pp. 1-9.

* cited by examiner

CATALYSTS FOR OXIDATION OF CARBON MONOXIDE AND/OR VOLATILE ORGANIC COMPOUNDS

CROSS-REFERENCE TO RELATED APPLICATIONS

This application claims priority to U.S. Provisional Patent Application No. 61/869,137, filed on Aug. 23, 2013, which is incorporated herein by reference in its entirety.

FIELD OF THE INVENTION

This invention relates to catalysts, compositions comprising the catalysts, methods of making the catalysts, and uses of the catalysts for oxidation of carbon monoxide (CO) and/or volatile organic compounds (VOCs) to carbon dioxide at temperatures that are less than about 150° C., and in certain embodiments at ambient temperatures. In some embodiments, the catalyst oxidizes the VOCs and/or CO at ambient temperatures ranging from about 15° C. to about 30° C.

BACKGROUND OF THE INVENTION

Industrial operations typically emit large quantities of pollutants such as CO and VOCs. Vehicles, aircrafts, waste water treatment plants, light manufacturing facilities, certain small businesses (e.g., dry cleaners, bakeries, restaurants, etc.), and homes also emit CO and VOCs, albeit typically in much smaller quantities compared to industrial operations.

CO is known for its toxicity to humans and animals due to its high affinity to hemoglobin, which reduces the effectiveness of oxygen transportation in blood even at a concentration level of a hundred ppm. VOCs cause several health and environmental problems and are also precursors of ground-level ozone, which contributes to smog formation. The overall chemistry is a complex interaction between VOCs, NOx and ozone which results in the formation of photochemical smog. Conventional technologies such as themocatalytic oxidation are usually found to be expensive to implement and have a tendency to result in secondary pollution at low temperatures.

The emission control of VOCs and CO at temperatures ranging from about 20° C. to about 50° C. has become increasingly important for public health, government regulation, and business development. For example, formaldehyde which is a major indoor air pollutant has been listed recently as a carcinogen. Currently known technologies for VOCs and CO abatement at low temperatures, especially at about room temperature, include photocatalysis, high voltage discharge, sorbents, and oxidation catalysts.

However, none of the currently known methods appear to achieve removal of VOCs and/or CO at temperatures ranging from about 20° C.-50° C. by complete oxidation.

From a practical application point of view, removal of VOCs and/or CO at temperatures ranging from about 20° C. to about 50° C. by complete oxidation has significant advantages over other known methods due to its low consumption of energy and raw materials, low production cost, and high selectivity.

There is a need to develop more active oxidation catalysts that allow the complete oxidation of CO and the VOCs at room temperature with sufficient stability and durability.

SUMMARY OF THE INVENTION

According to one embodiment, a catalyst comprising: a reduced precious group metal in an amount greater than about 30 wt % based on the total precious group metal weight in the catalyst, wherein the catalyst oxidizes VOCs and/or CO at a temperature of about 150° C. or lower, is disclosed.

In certain embodiments, the catalyst oxidizes the VOCs and/or CO at ambient temperatures ranging from about 15 to about 30° C.

According to another embodiment, a catalyst for oxidation of VOCs and/or CO to form carbon dioxide at a temperature of from about 20° C. to about 45° C. and at about atmospheric pressure, the catalyst comprising: a reduced precious group metal dispersed on a support selected from the group consisting of $CeO_2$, $TiO_2$, $ZrO_2$, $Al_2O_3$, $SiO_2$, and combinations thereof, is disclosed.

According to another embodiment, a method of making a precious group metal catalyst comprising: (i) impregnating a precious group metal on a support in the form of a dissolved salt solution; and (ii) reducing the precious group metal in cationic form to a reduced precious group metal in metallic form by reductants in gas phase, liquid phase, solid phase, or combinations thereof, is disclosed.

The oxidation of CO and/or VOCs such as formaldehyde, methanol, and formic acid to form carbon dioxide at a temperature of from about 20° C. to about 45° C. and at about atmospheric pressure can be completed at a conversion of about 90% or higher. In certain embodiments, the oxidation of formaldehyde, methanol, formic acid, and/or CO to form carbon dioxide at a temperature of from about 25° C. to about 35° C. and at about atmospheric pressure can be completed at a conversion of about 95% or higher. In certain embodiments, the oxidation of formaldehyde, methanol, formic acid, and/or CO to form carbon dioxide at a temperature of from about 25° C. to about 35° C. and at about atmospheric pressure can be completed at a conversion of about 98% or higher. In certain embodiments, the oxidation of formaldehyde, methanol, formic acid, and/or CO to form carbon dioxide at a temperature of from about 25° C. to about 35° C. and at about atmospheric pressure can be completed at a conversion of about 99% or higher. In certain embodiments, the oxidation of formaldehyde, methanol, formic acid, and/or CO to form carbon dioxide at a temperature of from about 25° C. to about 35° C. and at about atmospheric pressure can be completed at a conversion of about 100%.

DETAILED DESCRIPTION

The terms "about" or "approximately" when used herein and associated with a numeric value refer to that numeric value plus or minus 10%, in certain embodiments plus or minus 5%, in certain other embodiments plus or minus 2%, in yet certain other embodiments plus or minus 1%, in yet other embodiments plus or minus 0.5%, and in some other embodiments plus or minus 0.1%.

"Complete oxidation" as used herein refers to oxidation of CO and VOCs such as formaldehyde, methanol, and formic acid to form carbon dioxide at a temperature of from about 20° C. to about 45° C. and at about atmospheric pressure at a conversion of about 90% or higher, in some embodiments about 95% or higher, in some other embodiments about 98% or higher, in yet other embodiments about 99% or higher, and in certain embodiments about 100%.

The oxidation or complete oxidation of CO and VOCs referred to in this application is carried out at atmospheric pressure and at a temperature of less than about 150° C., in some embodiments at a temperature ranging from about 0° C. to about 100° C., in some other embodiments at a temperature ranging from about 15° C. to about 50° C., in yet other embodiments at a temperature ranging from about 20° C. to about 30° C., and in certain embodiments at a temperature ranging from about 21° C. to about 28° C.

According to one embodiment, a catalyst comprising: a reduced precious group metal in an amount greater than about 30 wt % based on the total precious group metal weight in the catalyst, wherein the catalyst oxidizes VOCs and/or CO at a temperature of about 150° C. or lower, is disclosed.

In certain embodiments, the catalyst oxidizes the VOCs and/or CO at ambient temperatures ranging from about 15 to about 30° C.

The reduced precious group metal is present in the catalyst in an amount between about 30 wt % and about 95 wt % based on the total precious group metal weight in the catalyst. In certain embodiments, the reduced precious group metal is present in the catalyst in an amount between about 50 wt % and about 95 wt % based on the total precious group metal weight in the catalyst. In certain other embodiments, reduced precious group metal is present in the catalyst in an amount between about 60 wt % and about 95 wt % based on the total precious group metal weight in the catalyst.

The reduced precious group metal has a mean crystallite size (i.e., mean diameter) of about 3 nm or less. In certain embodiments, the reduced precious group metal has a mean crystallite size in the range of about 2 nm or less. In certain other embodiments, the reduced precious group metal has a mean crystallite size in the range of about 1 nm to about 2 nm.

The reduced precious group metal is selected from the group consisting of platinum, palladium, rhodium, ruthenium, iridium, gold, and mixtures thereof. In certain embodiments, the reduced precious group metal is platinum.

The reduced precious group metal is dispersed on a support selected from the group consisting of $CeO_2$, $ZrO_2$, $TiO_2$, $SiO_2$, $Al_2O_3$, clay, zeolite, and mixtures thereof. In certain embodiments the support is $CeO_2$ or $TiO_2$.

In some embodiments, the reduced precious group metal can be dispersed on a support selected from the group consisting of a porous polymer, activated carbon, cellulose, wood powder, and mixtures thereof.

In other embodiments, the reduced precious group metal is dispersed on a composite material support, inorganic support, organic support, or combinations thereof.

According to another embodiment, a catalyst for oxidation of formaldehyde, methanol, formic acid, and/or CO to form carbon dioxide at a temperature of from about 20° C. to about 45° C. and at about atmospheric pressure, the catalyst comprising: a reduced precious group metal dispersed on a support selected from the group consisting of $CeO_2$, $TiO_2$, $ZrO_2$, $Al_2O_3$, $SiO_2$, and combinations thereof, is disclosed.

The oxidation of formaldehyde, methanol, formic acid, and/or CO to form carbon dioxide at a temperature of from about 20° C. to about 45° C. and at about atmospheric pressure can be completed at a conversion of about 90% or higher. In some embodiments, the oxidation of formaldehyde, methanol, formic acid, and/or CO to form carbon dioxide at a temperature of from about 25° C. to about 35° C. and at about atmospheric pressure can be completed at a conversion of about 95% or higher. In some other embodiments, the oxidation of formaldehyde, methanol, formic acid, and/or CO to form carbon dioxide at a temperature of from about 25° C. to about 35° C. and at about atmospheric pressure can be completed at a conversion of about 98% or higher. In yet other embodiments, the oxidation of formaldehyde, methanol, formic acid, and/or CO to form carbon dioxide at a temperature of about from about 25° C. to about 35° C. and at about atmospheric pressure can be completed at a conversion of about 99% or higher. In certain other embodiments, the oxidation of formaldehyde, methanol, formic acid, and/or CO to form carbon dioxide at a temperature of from about 25° C. to about 35° C. and at about atmospheric pressure can be completed at a conversion of about 100%.

The reduced precious group metal in certain embodiments is platinum.

In some embodiments, the catalyst can be promoted by bismuth oxide. The weight ratio of bismuth to the reduced precious group metal is between about 0.1 and about 100. In some embodiments, the weight ratio of bismuth to the reduced precious group metal is between about 1 and about 75. In some other embodiments, the weight ratio of bismuth to the reduced precious group metal is between about 1 and about 10.

According to another embodiment, a method of making a precious group metal catalyst comprising: (i) impregnating a precious group metal on a support in the form of a dissolved salt solution; and (ii) reducing the precious group metal in cationic form to a reduced precious group metal in metallic form by reductants in gas phase, liquid phase, solid phase, or combinations thereof, is disclosed.

The reductants in gas phase are hydrogen or formic acid. The reductants in liquid or solid phase are formic acid, ammonium formate, or any other known organic or inorganic reducing agents such as ascorbic acid and hydrazine.

Step (i) in the above process can be completed by incipient wetness, rotary evaporation, spray drying, or combinations thereof.

The catalyst obtained by the above process can be coated on a monolith honeycomb, a formed refractory oxide substrate, a formed polymer substrate, and combinations thereof.

There are several application of the catalysts described herein. For example, the catalysts described herein can be used for vehicle and aircraft cabin air cleaning, addressing "sick building syndrome" in homes and buildings, cleaning CO and VOCs emanating from municipal underground pipes, coal mines, etc.

The catalysts described herein have been demonstrated to remove up to about 100% of CO and VOCs at temperatures ranging from about 20° C. to about 30° C. by complete oxidation to $CO_2$. The catalysts described herein have also demonstrated good stability in the presence of water and $CO_2$.

Several special features of the presently described catalysts relating to preparation, reaction conditions, and activity are discussed hereinbelow.

The Pt-based catalysts are reduced at a relatively low temperature prior to the reaction for the formation of finely dispersed precious metal crystallites with platinum, which is in metallic state in certain embodiments.

Adding metal oxide promoters such as bismuth oxide enhances significantly the oxidation conversion due mainly to the stabilization of precious metal dispersion. Bismuth oxide may also reduce the surface occupation of Pt sites by CO. Of the Pt catalysts studied in this work, Bi-promoted Pt/CeO$_2$ showed the highest activity.

For CO oxidation, the presence of a small amount of moisture as low as about 500 ppm in the reactant mixture promotes the oxidation greatly.

In certain embodiments, at least about 500 ppm of water is added to the reactant mixture to enhance the complete oxidation of CO.

On the other hand, presence of moisture had some negative effect for the oxidation of VOCs, such as methanol.

In certain embodiments, moisture is removed from the reactant mixture prior to its contact with catalysts for the complete oxidation of VOCs.

The following reactions show complete oxidation of CO and VOCs to carbon dioxide.

$$2CO + O_2 \rightarrow 2CO_2$$

$$HCOH + O_2 \rightarrow CO_2 + H_2O$$

$$2CH_3OH + 3O_2 \rightarrow 2CO_2 + 4H_2O$$

$$CH_3OOH + O_2 \rightarrow CO_2 + 2H_2O$$

EXAMPLES

1. Catalyst Synthesis

Catalysts were prepared by a simple impregnation of platinum nitrate or a mixture of platinum nitrate and bismuth nitrate aqueous solution on an oxide support, dehydration in a rotary evaporator at 80° C. followed by drying at 110° C. overnight, and then reduction in 5% H$_2$/N$_2$ at 400° C. for up to 2 hours. Typical Pt loading is 1 wt %, though the PM loading level can be adjusted depending on the applications and the reaction conditions required.

2. Catalyst Testing

Catalyst activity was measured using a flow-through reactor. 10 grams of pelletized catalyst sample with a particle size of 40-60 mesh was placed in the quartz tube reactor of 1 inch diameter. A typical space velocity was 50,000 hr$^{-1}$. Because of different bulk density of various supports used, to keep the space velocity constant, some samples were diluted with pelletized alumina to make the catalyst volume the same. The starting concentration of CO, formaldehyde, methanol, and formic acid were approximately 500, ~100, ~140, and ~150 ppm, respectively. The gaseous reactants (either from a gas tank mixed with N$_2$ or by bubbling N$_2$ through an organic liquid) were mixed with air prior to entering the reactor. Typical O$_2$ concentration in the reactor was about 20%. The reaction products were identified and quantified by a FTIR detector (MKS MultiGas 2030). To study the effect of CO$_2$ and water, a controlled amount of CO$_2$ and/or 2.0% water were added to the reactant mixture when needed.

3. Catalyst Characterization

Precious metal morphology and crystallite size was characterized by high resolution TEM and X-ray diffraction (XRD). Precious metal oxidation state and speciation was determined by X-ray photoelectron spectroscopy (XPS). Some instrumental information for each spectroscopy method is given below.

TEM data was collected on a JEOL JEM2011 200 KeV LaB6 source microscope with a Bruker Ge EDS system using Spirit software. Digital images were captured with a bottom mount Gatan 2K CCD camera and Digital Micrograph collection software. All powder samples were prepared and analyzed as dry dispersions on 200 mesh lacey carbon coated Cu grids.

XRD—a PANalytical MPD X'Pert Pro diffraction system was used with Cu$_{K\alpha}$ radiation generator settings of 45 kV and 40 mA. The optical path consisted of a ¼° divergence slit, 0.04 radian soller slits, 15 mm mask, ½° anti-scatter slits, the sample, 0.04 radian soller slits, Ni filter, and a PIXCEL position sensitive detector. The samples were first prepared by grinding in a mortar and pestle and then backpacking the sample (about 2 grams) into a round mount. The data collection from the round mount covered a range from 10° to 90° 2θ using a step scan with a step size of 0.026° 2θ and a count time of 600 s per step. A careful peak fitting of the XRD powder patterns was conducted using Jade Plus 9 analytical XRD software. The phases present in each sample were identified by search/match of the PDF-4/Full File database from ICDD, which is the International Center for Diffraction Data. Crystallite size of PdO was estimated through whole pattern fitting (WPF) of the observed data and Rietveld refinement of crystal structures.

XPS—spectra were taken on a Thermo Fisher K-Alpha XPS system which has an aluminum K Alpha monochromatic source using 40 eV pass energy (high resolution). Samples were mounted on double sided tape under a vacuum of less than 5×10-8 torr. Scofield sensitivity factors and Avantage software were used for quantification.

Results

1. Catalytic Activity 1-1 CO Oxidation.

Figure 1:
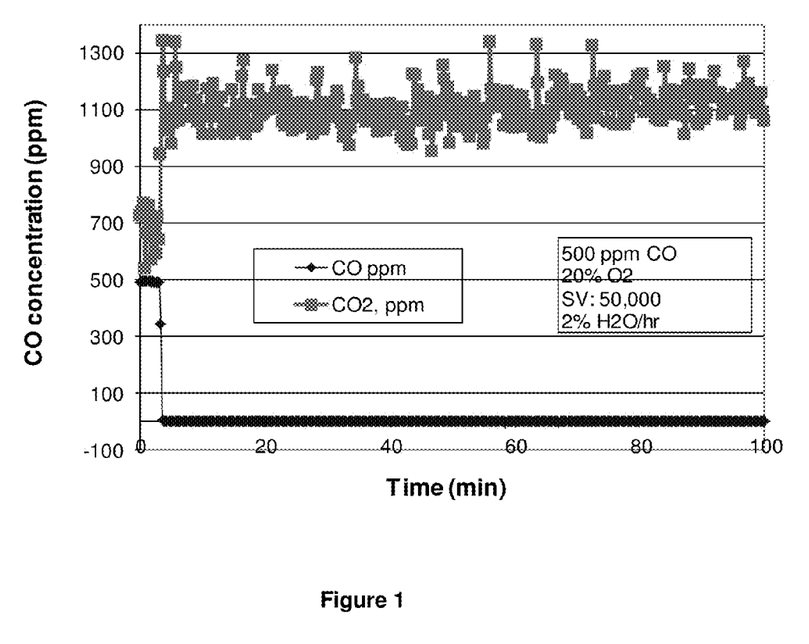
FIG. 1 shows a chart of CO and $CO_2$ concentration profiles during CO oxidation on 1% $Pt/TiO_2$ at 25° C.

FIG. 1 demonstrates the FTIR intensities of CO and CO$_2$ during the oxidation reaction of CO on 1% Pt/TiO$_2$ at room temperature. There was about 600 ppm CO$_2$ in the starting reactant mixture as a background. The kinetics of CO oxidation was fast: 100% CO conversion to CO$_2$ was observed as soon as CO and CO$_2$ were mixed together and 1100 ppm of CO$_2$ was detected. FIG. 1 only covers a small section of the reaction time up to 100 minutes. The CO conversion remained 100% during the entire reaction time of 48 hours.

1-2 Effect of Pre-Reduction on CO Oxidation.

Pre-reduction of the Pt catalysts was found to be critical for the CO oxidation reaction. For example, when the 1% Pt/TiO$_2$ catalyst was only calcined in air at 400 or 550° C., the CO conversion was about 9% with the absence of moisture and 11% with the presence of moisture. After the sample was reduced at 400° C., CO conversion was greatly improved to 100%, same as the sample that was reduced directly without the precalcination in air, see Table 1.

TABLE 1

| CO conversion (%) to CO$_2$ over reduced, calcined, and calcined & reduced 1% Pt/TiO$_2$ catalysts at room temperature | | | | | |
|---|---|---|---|---|---|
| Reduced | | Calcined | | Calcined & Reduced | |
| w/o H$_2$O | w/ H$_2$O | w/o H$_2$O | w/ H$_2$O | w/o H$_2$O | w/ H$_2$O |
| 100 | 100 | 9 | 11 | 40 | 100 |

1-3 Water Promotion on CO Oxidation.

Figure 2:
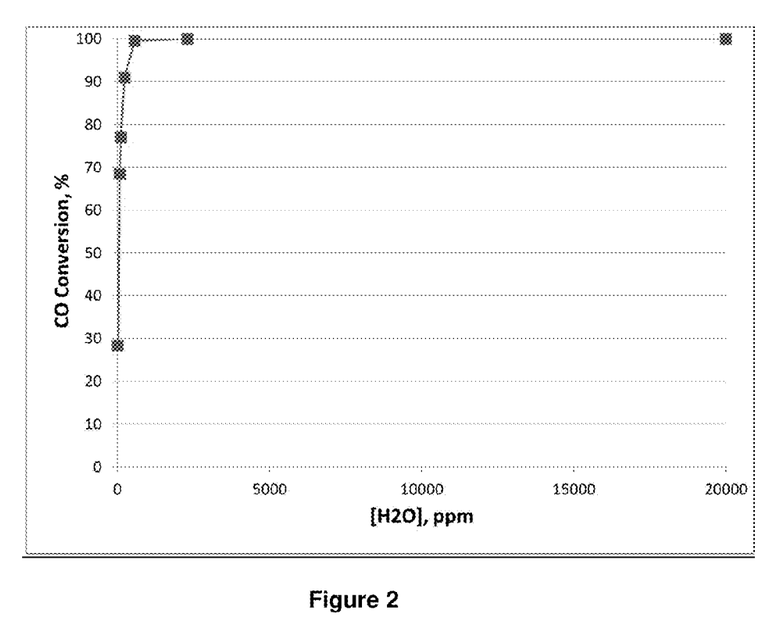
FIG. 2 shows a chart of the dependence of CO conversion on water concentration at 25° C.

Water played a significant role in CO oxidation reaction. FIG. 2 demonstrates the dependence of CO conversion on water concentration over 1% $Pt/CeO_2$ catalyst. The data shows that a very small amount of water could dramatically enhance the CO conversion at a water concentration between 0 and 500 ppm. The conversion remained 100% after $H_2O$ concentration was above 500 ppm. Similar effect of water concentration was observed for 1% $Pt/TiO_2$ catalyst.

1-4 Effect of Bismuth Additive on CO Oxidation.

To evaluate the effect of bismuth additive on catalyst activity, a number of reactor conditions were varied including space velocity SV, $O_2$ concentration [$O_2$], and CO concentration [CO] on four catalysts: 1% $Pt/TiO_2$, 1% $Pt/CeO_2$, (1% Pt+2.5% Bi)/$TiO_2$, and (1% Pt+2.5% Bi)/$CeO_2$. The results are listed in Table 2.

TABLE 2

Effect of reactor conditions on CO conversion (%) to $CO_2$

| Reactor variables | | Other reactor conditions | 1% Pt on $TiO_2$ | (1% Pt + 2.5% Bi)/$TiO_2$ | 1% Pt on $CeO_2$ | (1% Pt + 2.5% Bi)/$CeO_2$ |
|---|---|---|---|---|---|---|
| SV = | 50 k | [CO] = 500 ppm, | 100 | 100 | 100 | 100 |
|  | 100 k | [$O_2$] = 20%, | 100 | 100 | 100 | 100 |
|  | 200 k | [$H_2O$] = 2% | 100 | 100 | 96 | 100 |
|  | 500 k |  | 100 | 100 | 90 | 100 |
| [$O_2$] = | 20% | SV = 1,000,000 $hr^{-1}$, | 40 | 92 | 64 | 94 |
|  | 10% | [CO] = 500 ppm; | 25 | 88 | 50 | 92 |
|  | 5% | [$H_2O$] = 2% | 10 | 75 | 46 | 88 |
|  | 1% |  | 5 | 34 | 36 | 64 |
|  | 0.2% |  | 2 | 16 | 28 | 20 |
| [CO] = | 500 ppm | SV = 1,000,000 $hr^{-1}$, | 32 | 84 | 44 | 88 |
|  | 2000 ppm | [$O_2$] = 20%; | 10 | 25 | 21 | 50 |
|  | 5000 ppm | [$H_2O$] = 2% | 8 | 20 | 20 | 24 |
|  | 1% |  | 4 | 10 | 12 | 10 |

The data in Table 2 shows that, in a fairly wide range of space velocity between 50,000 to 500,000 $hr^{-1}$, CO conversion was at or close to 100% at a constant [CO]=500 ppm, [O2]=20%, and [H2O]=2%. On the other hand, at a space velocity of 1 million $hr^{-1}$, significantly reduced CO conversion was observed when $O_2$ concentration is below 10% or CO concentration was above 2000 ppm. The relative activity of the four catalysts is in the following order:

(1% Pt+2.5% Bi)/$CeO_2$>(1% Pt+2.5% Bi)/$TiO_2$>1% Pt/$CeO_2$>1% Pt/$TiO_2$ 1-5 VOC Oxidation.

Figure 3:
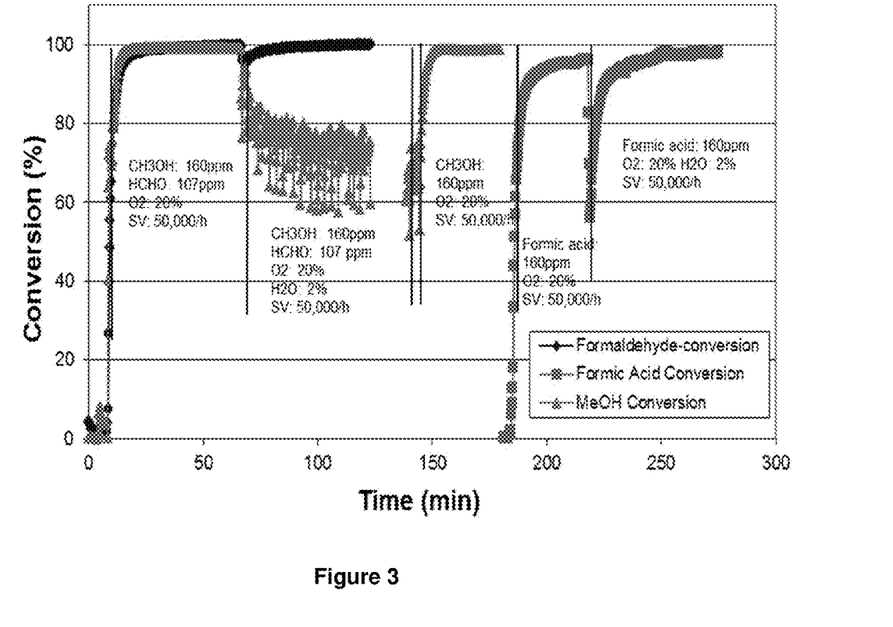
FIG. 3 shows a chart of the conversion of formaldehyde, methanol, and formic acid on 1% $Pt/TiO_2$ catalyst at 25° C.

FIG. 3 demonstrates the conversion of formaldehyde, methanol, and formic acid on 1% $Pt/TiO_2$ catalyst at room temperature. The reaction profiles in FIG. 3 were divided into five sections referred hereinafter as Section I, Section II, Section III, Section IV, and Section V. In Section I, formaldehyde and methanol showed 100% conversion when water was absent in the reactant mixture. A small perturbation of the conversion at the first 5-10 minutes was due to the absorption/desorption of formaldehyde or methanol on the catalyst. After water was introduced (Section II), the conversion of formaldehyde remained 100% while the conversion of methanol was reduced to about 70%. However, when water and formaldehyde were removed from the reactant mixture (Section III), the conversion of methanol was recovered to 100%. Water had little effect on the conversion of formic acid, which approached to 100% regardless of whether water was present (Section IV) or absent (Section V).

Table 3 summarizes the conversion rate of CO, formaldehyde, methanol, and formic acid on 1% Pt catalysts supported on various oxides with both presence and absence of water.

[$O_2$]=20%, SV=20,000 $hr^{-1}$ for VOCs and 50,000 $hr^{-1}$ for CO, starting concentration [HCOH]~100 ppm, [$CH_3OH$]~140 ppm, [$CH_3OOH$]~150 ppm, [CO]=500 ppm, and [$H_2O$]=2%

TABLE 3

Conversion (%) for oxidation of CO and VOC under ambient conditions (i.e., about 25° C. and atmospheric pressure)

| 1% Pt catalyst Support | Formaldehyde | | Methanol | | Formic Acid | | CO | |
|---|---|---|---|---|---|---|---|---|
|  | w/ $H_2O$ | w/o $H_2O$ | w/ $H_2O$ | w/o $H_2O$ | w/ $H_2O$ | w/o $H_2O$ | w/ $H_2O$ | w/o $H_2O$ |
| $TiO_2$ | 100 | 100 | 70 | 100 | 100 | 100 | 100 | 40 |
| $ZrO_2$ | 100 | 100 | 80 | 98 | 100 | 100 | 100 | 60 |

TABLE 3-continued

Conversion (%) for oxidation of CO and VOC under ambient conditions (i.e., about 25° C. and atmospheric pressure)

| 1% Pt catalyst Support | Formaldehyde | | Methanol | | Formic Acid | | CO | |
|---|---|---|---|---|---|---|---|---|
|  | w/ $H_2O$ | w/o $H_2O$ | w/ $H_2O$ | w/o $H_2O$ | w/ $H_2O$ | w/o $H_2O$ | w/ $H_2O$ | w/o $H_2O$ |
| $Al_2O_3$ | 100 | 100 | 65 | 96 | NT* | NT | 100 | 40 |
| $CeO_2$ | 100 | 100 | 70 | 40 | 100 | 100 | 100 | 100 |
| $TiO_2$ (2.5% Bi) | 100 | 100 | 25 | 100 | NT | NT | 100 | 100 |

*NT = not tested

The main conclusions from the above experimental data on Pt catalysts can be summarized in the following.

For CO oxidation in the absence of moisture, when a single component support was used, e.g., $TiO_2$, $ZrO_2$, $Al_2O_3$, or $CeO_2$, only 1% $Pt/CeO_2$ gave a 100% conversion. However, adding a small amount of water significantly promoted the conversion to 100% for all the Pt catalysts.

Pre-reduction of the Pt catalysts is crucial for CO oxidation at room temperature. When 1% $Pt/TiO_2$ catalyst was only calcined in air, very little CO oxidation was observed. Reduction of the calcined samples led to 100% of CO conversion, same as those reduced directly without calcination in air.

Adding promoters such as bismuth also significantly enhanced the CO oxidation. For example, an addition of 2.5% Bi to 1% $Pt/TiO_2$ increased the conversion of CO oxidation from 40% to 100% with the absence of water.

For the oxidation of formaldehyde, all the catalysts showed a 100% conversion after 2 hours of reaction time regardless of whether or not moisture was present in the reactant mixture. 100% oxidation of formic acid was also observed for all the catalysts that were studied, i.e., 1% Pt supported on TiO2, ZrO2, and CeO2. Methanol was more challenging to be fully oxidized to $CO_2$, especially when moisture was present. Water has a major negative effect on the methanol conversion.

1-6 Activity of Other Precious Metals.

Figure 4:
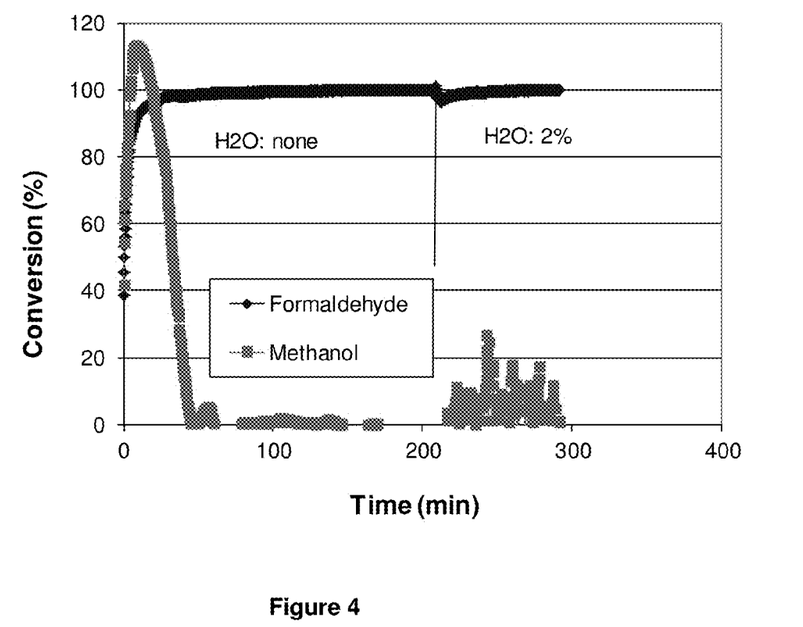
FIG. 4 shows a chart of oxidation of formaldehyde and methanol on 1% $Pd/TiO_2$ at 25° C. (CO: 500 ppm; HCHO: 123 ppm; CH3OH: 166 ppm; SV: 50,000/h; 1% Pd/TiO2).

Table 4 shows the conversion of CO and formaldehyde over other precious metal catalysts supported on $TiO_2$ under the ambient conditions (i.e., about 25° C. and atmospheric pressure). Palladium is a lower cost precious metal compared to platinum. When supported on $TiO_2$, the Pd catalyst showed 100% conversion of CO with the presence of water regardless whether the catalyst was reduced or calcined in air at 400° C. When water was removed, the CO conversion decreased slowly to about 60% after 1,000 minutes of reaction time. $Pd/TiO_2$ also showed 100% conversion for formaldehyde, whether water was present or not, similar as $Pt/TiO_2$. However, there was no conversion of methanol at room temperature for $Pd/TiO_2$, regardless whether moisture was present or not. The observation of some "conversion" at the first 30 minutes of reaction time, shown in FIG. 4, was due to adsorption and desorption of methanol by the catalyst. The conversion of formaldehyde on $Ir/TiO_2$ and $PtRu/TiO_2$ are also listed in Table 4.

TABLE 4

CO and formaldehyde oxidation under ambient conditions (i.e., about 25° C. and atmospheric pressure) over precious metal catalysts (other than Pt) supported on $TiO_2$

| Catalyst | Reactant | Conversion, % | Conditions |
| --- | --- | --- | --- |
| 1% Pd/$TiO_2$ or 1% PdO/$TiO_2$ | Formaldehyde | 100 | 123 ppm HCHO, 20% $O_2$ in air, 0 or 2% $H_2O$, 50 k SV |
| | CO | 100 | 500 ppm CO, 20% $O_2$ in air, 2% $H_2O$, 50 k SV |
| 1% Ir/$TiO_2$ | Formaldehyde | 98 | 120 ppm HCHO, 20% $O_2$ in air, 2% $H_2O$, 50 k SV |
| 1%(Pt + Ru,Pt/Ru = 1)/$TiO_2$ | Formaldehyde | 100 | 105 ppm HCHO, 20% $O_2$ in air, 2% $H_2O$, 50 k SV |

2. Catalysts Stability

Figure 5A:
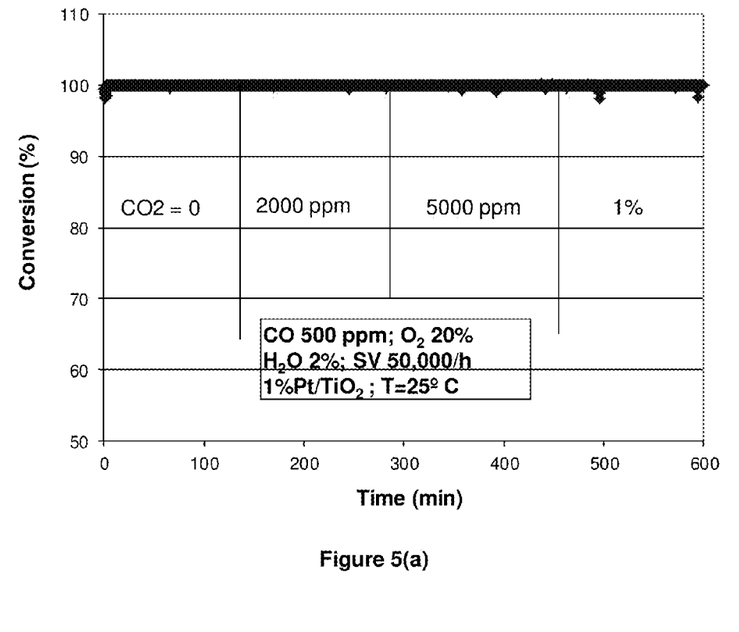
FIG. 5(a) shows a chart of catalyst stability in the presence of $CO_2$ for oxidation of CO at 25° C.
Figure 5B:
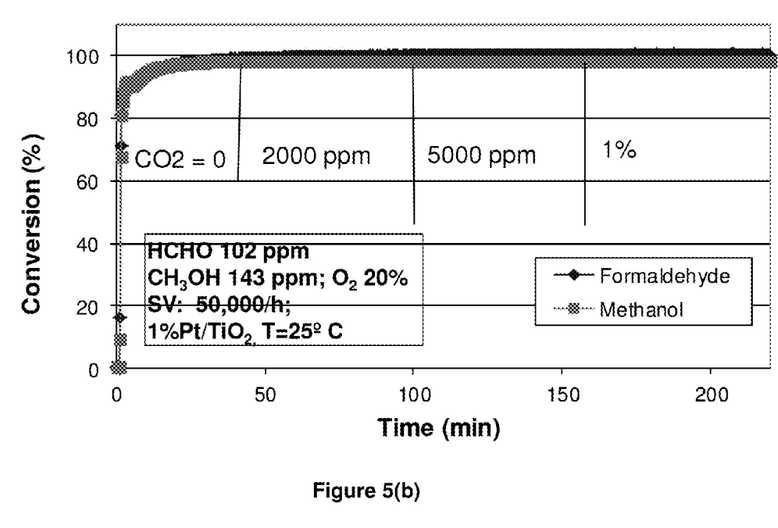
FIG. 5(b) shows a chart of catalyst stability in the presence of $CO_2$ for oxidation of formaldehyde and methanol on 1% Pt/TiO2 at 25° C.

As all the reactions were studied at room temperature, the precious metals and the oxide supports do not experience the aging effect as those used at high temperature. It was reported that water and $CO_2$ had poisoning effect when catalysts were exposed to air. As shown in Table 3, we found that water actually helps the CO oxidation. Water had some negative impact on the oxidation of methanol, possibly due to competitive adsorption of water and methanol on the precious metal sites. $CO_2$ did not show any significant impact on the oxidation of CO, formaldehyde, and methanol, shown in FIGS. 5(a) and 5(b).

Analysis

1. Effect of Support Porosity

In order to understand the relationship between catalyst structures and their activity, a number of physical and chemical properties of the catalysts were studied. The $N_2$ porosity of the support materials was measured, and the BET surface area (BET) and pore volume (PV) are listed in Table 5. Although the surface area and pore volume were varied significantly among the support oxides, after loaded with the platinum, the activity of the catalysts were all high and were not apparently to correlate with the support porosity.

TABLE 5

$N_2$ Porosity of the support materials

| Material | BET, $m^2/g$ | PV*, cc/g |
| --- | --- | --- |
| $TiO_2$ | 85 | 0.55 |
| $CeO_2$ | 148 | 0.34 |
| $ZrO_2$ | 15 | 0.14 |
| $Al_2O_3$ | 156 | 0.84 |

*PV = pore volume, PD = pore diameter

2. Effect of Precious Metal Crystallite Size.

Figure 6A:
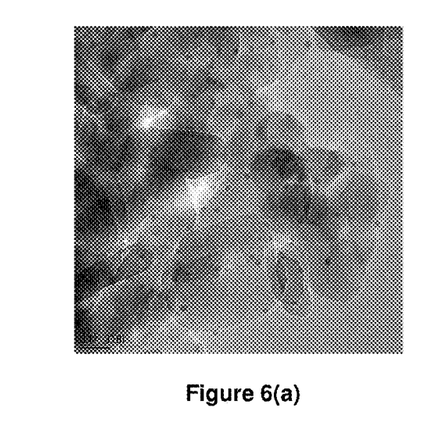
FIG. 6(a) shows a Transmission Electron Microscopy (TEM) of 1% Pt/TiO2.
Figure 6B:
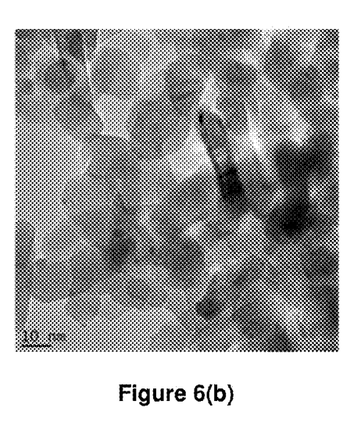
FIG. 6(b) shows a TEM of 1% Pd/TiO2.

The crystallite size of dispersed platinum and palladium was measured by XRD and TEM. As the catalysts were prepared at a mild condition (the highest heating temperature was 400° C.), the PM crystallites size on the supports were small in general. TEM shows that Pt or Pd particle size on $TiO_2$ and $CeO_2$ is about 1-2 nm (FIGS. 6(a) and 6(b)). The Pt particle size on $CeO_2$ with Bi additive is too small to be detected by TEM, possibility in the sub-nanometer range. Thus, the high activity of Pt catalysts is most likely due to the high Pt dispersion. The higher CO conversion on bismuth promoted catalysts might be due to the smaller Pt size.

3. Effect of Surface Pt Concentration and Oxidation State

XPS data offers further details of Pt surface concentration and oxidation state. The data in Table 6 shows the ionic Pt species and nitrate in the dried-only sample, which is consistent with its zero activity. After being calcined in air at 400° C., nitrate species were burned off and Pt were mainly in the form of Pt(+2) or Pt(+4). No Pt(0) species was detected. On the other hand, when the catalyst was reduced either from the dried sample or the pre-calcined sample, the dominant Pt species are Pt(0). No nitrate species was detected. When comparing the XPS data in Table 6 with the CO oxidation data in Table 1, it is clear that it is the Pt(0) that was responsible for CO conversion. In other words, it is essential to keep platinum in highly dispersed metallic state for the complete oxidation of CO.

TABLE 6

XPS speciation of $Pt/TiO_2$ pre-treat under different conditions

| Sample Treatment | Pt(0) | Pt(+2) | Pt(+4) | $NO_3$ | Pt(0), % |
| --- | --- | --- | --- | --- | --- |
| Dried @ 110° C. | ND* | 0.38 | 0.07 | 1.2 | 0 |
| Reduced in $H_2$ @ 400° C. | 0.25 | 0.13 | ND | ND | 66 |
| Calcined in air @ 400° C. | ND | 0.28 | 0.13 | ND | 0 |
| Calcined in air @ 400 C and then reduced in $H_2$ @ 400° C. | 0.20 | 0.09 | ND | ND | 69 |

*ND = not detectable

Low temperature removal of CO and small VOC molecules such as formaldehyde, methanol, and formic acid is highly desirable for public health protection. The above examples demonstrate that these pollutants can be removed 100% at ambient temperatures (i.e., ranging from about 15 to about 30° C.) by complete oxidation to $CO_2$ over precious metal based catalysts. The catalysts also showed good stability in the presence of water and $CO_2$. Several features of catalyst preparation and the reaction conditions proved to be important, as discussed previously.

The catalysts should be useful for the removal of other VOC species such as alkanes, alkenes, alcohols, aldehydes, ketones, amines, organic acids, aromatic compounds, and/or combinations thereof typically encountered as air pollutants.

The present invention has been described by way of the foregoing exemplary embodiments to which it is not limited. Variations and modifications will occur to those skilled in the art that do not depart from the scope of the invention as recited in the claims appended thereto.

What is claimed is:

1. A catalyst comprising:
    a precious group metal,
    wherein between about 30 wt % and about 95 wt % of the precious group metal is a reduced precious group metal, and
    wherein the catalyst oxidizes volatile organic compounds and/or carbon monoxide at a temperature ranging from about 15° C. to about 50° C. and at an atmospheric pressure.

2. The catalyst of claim 1, wherein the reduced precious group metal has a mean crystallite size of about 3 nm or less.

3. The catalyst of claim 1, wherein the reduced precious group metal is selected from the group consisting of platinum, palladium, rhodium, ruthenium, iridium, gold, and mixtures thereof.

4. The catalyst of claim 1, wherein the catalyst oxidizes volatile organic compounds and/or carbon monoxide at temperatures ranging from about 15° C. to about 30° C.

5. The catalyst of claim 1, wherein the reduced precious group metal is dispersed on a support selected from the group consisting of $CeO_2$, $ZrO_2$, $TiO_2$, $SiO_2$, $Al_2O_3$, clay, zeolite, and mixtures thereof.

6. The catalyst of claim 1, wherein the reduced precious group metal is dispersed on a support selected from the group consisting of a polymer, activated carbon, cellulose, wood, powder, and mixtures thereof.

7. The catalyst of claim 1, wherein the reduced precious group metal is dispersed on a composite material support, inorganic support, organic support, or combinations thereof.

8. A catalytic system comprising the catalyst of claim 1.

9. The catalyst of claim 1, wherein the oxidation of the volatile organic compounds and/or the carbon monoxide to form carbon dioxide at a temperature of from about 20° C. to about 45° C. and at about atmospheric pressure is completed at a conversion of about 90% or higher.

10. The catalyst of claim 9, wherein the conversion is about 95% or higher.

11. A catalyst comprising:
    a precious group metal,
    wherein between about 30 wt % and about 95 wt % of the precious group metal is a reduced precious group metal,
    wherein the reduced precious group metal is dispersed on a support selected from the group consisting of $CeO_2$, $TiO_2$, $ZrO_2$, $Al_2O_3$, $SiO_2$, and combinations thereof, and
    wherein the catalyst oxidizes volatile organic compounds and/or carbon monoxide at a temperature ranging from about 20° C. to about 45° C. and at about an atmospheric pressure.

12. The catalyst of claim 11, wherein the oxidation of the volatile organic compounds and/or the carbon monoxide to form carbon dioxide at a temperature of from about 20° C. to about 45° C. and at about atmospheric pressure is completed at a conversion of about 90% or higher.

13. The catalyst of claim 11, wherein the reduced precious group metal is selected from the group consisting of platinum, palladium, rhodium, ruthenium, iridium, gold, and mixtures thereof.

14. The catalyst of claim 11, wherein the catalyst is promoted by bismuth oxide.

15. The catalyst of claim 14, wherein the weight ratio of bismuth to the reduced precious group metal is between about 0.1 to about 100.

16. The catalyst of claim 11, wherein the volatile organic compounds include formaldehyde, methanol, and/or formic acid.

17. A method of making a precious group metal catalyst comprising:
    (i) impregnating a precious group metal on a support in the form of a dissolved salt solution; and
    (ii) reducing the precious group metal in cationic form to a reduced precious group metal in metallic form by reductants in liquid phase, solid phase, or combinations thereof,
    wherein the reductants in liquid or solid phase are formic acid, ammonium formate, ascorbic acid, hydrazine, and combinations thereof.

18. The method of claim 17, wherein step (i) is completed by incipient wetness, rotary evaporation, spray drying, or combinations thereof.

19. The catalyst obtained from the method of claim 17.

20. The catalyst of claim 19 is coated on a monolith honeycomb, a formed refractory oxide substrate, a formed polymer substrate, or combinations thereof.

21. The catalyst of claim 19 removes and/or oxidizes carbon monoxide and/or volatile organic compounds including alkanes, alkenes, alcohols, aldehydes, ketones, amines, organic acids, aromatic compounds, or combinations thereof, from a medium.

22. The catalyst of claim 21 wherein the medium is air or water.

23. The catalyst of claim 19, wherein at least about 500 ppm of water is added to a reactant gas mixture to promote oxidation of carbon monoxide and/or to remove moisture from the reactant gas mixture to maximize oxidation of volatile organic compounds.

* * * * *